Patented July 7, 1925.

1,544,649

UNITED STATES PATENT OFFICE.

JOHN L. KELLOGG, OF BATTLE CREEK, MICHIGAN, ASSIGNOR TO KELLOGG COMPANY, OF BATTLE CREEK, MICHIGAN, A CORPORATION OF DELAWARE.

PROCESS OF PRODUCING COFFEELIKE PRODUCTS.

No Drawing. Application filed February 2, 1921. Serial No. 441,816.

*To all whom it may concern:*

Be it known that I, JOHN L. KELLOGG, a citizen of the United States, residing at Battle Creek, in the county of Calhoun and State of Michigan, have invented certain new and useful Processes of Producing Coffeelike Products, of which the following is a specification.

My invention relates to the production of (*a*) coffee-like products, (*b*) beverages or percolates therefrom, and (*c*) dry soluble extracts secured from said beverages or percolates.

The objects of my invention are to improve the flavor and to lessen the expense of producing such products.

I accomplish these results in the manner hereinafter described and claimed, it being understood that changes in the method and products may be made within the scope of the claims and as indicated by the variations in the different claims without departing from the spirit of the invention.

I first select good healthy grain berries of wheat and rye. However, barley or any other cereals may be used which can be sprouted and malted, but I prefer to use wheat and rye.

These grains are soaked in cold water for from 36 to 48 hours, the water being changed at intervals of three or six times during the soaking process.

The water is then drained off the grains, the grains spread out on a suitable surface to a thickness of 10 to 14″ and allowed to sprout; care being taken not to allow the grains to over-heat during the sprouting process. The grains are turned over at intervals. The sprouting process generally takes from 4 to 6 days, according to the temperature of the room. Of course the sprouting may be carried on to a greater or lesser extent according to the result desired.

The grain is then placed in a dryer and dried at a very low temperature. I prefer to use a temperature of about 90 degrees. This slow drying process may take place for 3 to 6 days or the temperature may be raised after the 3rd day to 120 degrees for 12 hours and later to 140 to 150 degrees. The grains being now dried are ready for further processing.

The malted grain at this point may be roasted and a percolate and extract made therefrom, the advantages over a cooked grain being that malted grain after roasting will give a much greater yield and a better flavor than raw roasted grains or cooked grain.

However, I prefer to put the grains through a further process of inversion, as follows:—First cover the grains with water not to exceed 155 to 159 degrees Fahr. The grains should be kept at this temperature from 30 minutes to two hours. (I prefer to use the longer period), and are kept in agitation so as to remain at constant temperature. However, this is not necessary.

After the inversion process, the water in which the grains are inverted contains a considerable quantity of sweetish extract which consists largely of maltose, being a starch conversion which has taken place in the grain during the inverting process.

The grains are now drained from the water extract and dried and made ready for roasting.

The liquid extract is saved, as it contains enzymes and is to be used in converting the starch found in ordinary wheat bran into maltose. The bran is added to the malt extract liquid and kept in constant agitation at a temperature of 155 to 158 degrees Fahr. At this temperature the enzymes contained in the malt extract convert the bran starches into maltose. All of the liquid extract obtained from the grains is utilized in this manner. This extract is also found to contain a sweetish bitter flavor which is very desirable in the finished product. The bran which has been thus treated is then dried and made ready for roasting.

Any suitable caramelized saccharine material, such as sugar, saccharine, molasses or the like, is added to the product either before or after the roasting operation. The selected saccharine material, or a mixture of such materials, is caramelized by burning over an open fire or otherwise and adding moisture thereto to produce liquid caramel by any of the well known processes. This liquid caramel is added to the malted cereals or bran or to both before roasting, or as hereafter, explained, it may be added to the product just before the final evaporating process is carried out. The malted and inverted wheat, rye, bran and caramel are then roasted either separately or together in an ordinary coffee roaster. I prefer to use the slow process of roasting, taking from 2 to 4 hours to complete the same; during which roasting process low temperatures are first used, thus aiding the further conversion of any raw starches which may be found in the grains or bran.

After the roasting process the roasted rye, wheat, bran and caramel are ground and percolated by any ordinary method. After the percolation process the extract is evaporated down into a thick syrup to about 18 degrees Baumé in a vacuum pan. The syrup is then dried by any ordinary dryer such as shelf vacuum dryer or rotary drum vacuum dryer. As above stated the liquid caramel may be added to the percolate just before it is finally evaporated and dried.

It is found that this process produces a yield of from 40 to 45% of solid soluble extractive material from the roasted grains, whereas in the ordinary method of roasting the raw grains would yield less than 20%. The malting also causes the grains to swell up about one-third larger than their natural size after the roasting process, whereas in the usual process of roasting raw or uncooked grains, the grains generally shrink in size during the roasting process.

This new process increases the yield of extract obtained from cereals and gives a flavor which closely resembles that of roasted coffee, producing a yield much greater than has ever been produced from roasted cereal or grains by any other process known to me.

During the malting process the sprouts obtained from the wheat and rye may be separated from the grains if desired. However, I prefer to use them as they later develop during the roasting process a sweetish bitter taste which gives the product a more decided coffee flavor.

I prefer to employ one third malted, converted and roasted wheat, one-third malted, converted and roasted rye and one-third bran treated in the manner described, but as before stated, other materials may be used and the proportions thereof may be widely varied.

If desired, in place of using the caramelized saccharine material as heretofore described, I may add molasses or other saccharine material to the cereal products such as wheat, rye and bran, before roasting the same and then roast the saccharine material along with the cereal products.

Another modification of the invention consists in malting the grain and then, instead of inverting it as described, cooking it in a revolving cooker or in any other suitable way for 15 minutes, more or less, at 15 lbs. steam pressure, more or less. The grain, preferably, is covered with water before the steam pressure is turned on. If desired the malted grain may be cooked in an open cooker. The malted and cooked grain is then dried and roasted, and the percolating, evaporating and drying steps are carried out as heretofore described.

What is claimed as new is:—

1. A process of producing a coffee-like product which consists in sprouting, inverting and roasting grain, converting bran with the inversion liquid from the grain, roasting the bran, then mixing the roasted bran with the roasted grain, and adding caramel before or after the roasting operation.

2. A method consisting in sprouting, drying, inverting, roasting and grinding grain and mixing the same with inverted and roasted bran and with a suitable caramel.

3. A method consisting in causing suitable grain to sprout, drying the same, inverting and again drying the dried grain, converting bran starches into maltose by soaking bran in the inversion liquid from the grains, then roasting the grain and bran separately and mixing the same, a suitable caramel liquid being added before or after the roasting.

JOHN L. KELLOGG.